United States Patent
Gottwald et al.

(10) Patent No.: US 9,940,347 B2
(45) Date of Patent: Apr. 10, 2018

(54) SYSTEMS AND METHODS FOR HIGH SPEED REMOTE CHANGE DATA CAPTURE

(71) Applicant: CA, Inc., Islandia, NY (US)

(72) Inventors: Vit Gottwald, Prague (CZ); Kevin P. Shuma, Celina, TX (US); Joseph Lynn, Plano, TX (US)

(73) Assignee: CA, Inc., Islandia, NY (US)

( * ) Notice: Subject to any disclaimer, the term of this patent is extended or adjusted under 35 U.S.C. 154(b) by 683 days.

(21) Appl. No.: 14/178,063

(22) Filed: Feb. 11, 2014

(65) Prior Publication Data

US 2015/0227572 A1    Aug. 13, 2015

(51) Int. Cl.
  G06F 17/30    (2006.01)
  G06F 9/355    (2018.01)
  G06F 11/20    (2006.01)

(52) U.S. Cl.
  CPC ...... *G06F 17/30368* (2013.01); *G06F 9/3552* (2013.01); *G06F 11/2048* (2013.01); *G06F 11/2097* (2013.01); *G06F 17/30581* (2013.01); *G06F 11/2038* (2013.01); *G06F 2201/80* (2013.01)

(58) Field of Classification Search
  CPC .......... G06F 11/07; G06F 11/14; G06F 17/30; G06F 17/30345; G06F 17/30368; G06F 17/30575; G06F 17/30581
  USPC ....... 707/610, 611, 613, 615, 624, 625, 634, 707/635, 637–640, 644, 648, 703
  See application file for complete search history.

(56) References Cited

U.S. PATENT DOCUMENTS

| | | | | |
|---|---|---|---|---|
| 2010/0077273 A1* | 3/2010 | Tada | .......... | H04L 1/18 714/748 |
| 2011/0231566 A1* | 9/2011 | Gelter | .......... | H04L 49/90 709/231 |
| 2014/0129745 A1* | 5/2014 | Alfieri | .......... | G06F 5/10 710/53 |

* cited by examiner

*Primary Examiner* — Mark D Featherstone
*Assistant Examiner* — Diedra McQuitery
(74) *Attorney, Agent, or Firm* — GILLIAM IP PLLC

(57) ABSTRACT

A system and method are described for change data capture wherein a source database is replicated to a remote database. In one embodiment, a data storage device contains source log blocks containing information regarding database transactions processed for a source database, wherein the data storage device and source database are located in a first location, and at least some of the source log blocks include a plurality of database transactions in the same order as processed in the source database. Messages containing source log blocks are sent from the first location to a second location geographically remote from the first location. One or more components at the second location receive source log blocks from the messages, extract the source transaction data from the source log blocks, and use the source transaction data to write database transaction information to a second database based on the extracted source transaction data.

15 Claims, 10 Drawing Sheets

SYSTEMS AND METHODS FOR HIGH SPEED REMOTE CHANGE DATA CAPTURE

BACKGROUND

This application relates generally to change data capture systems and methods, and more particularly to remote change data capture systems and methods. Change data capture (CDC) is used in database systems to monitor and track data storage transactions, and in particular, changes to data committed to a data storage device or system. CDC systems are frequently deployed in data warehouses or data centers, where capturing and preserving the state of data across time is a core requirement. More generally, however, CDC systems can be deployed to track changes in data in any database or data repository, in any setting. One common application of a CDC solution is to maintain a mirror image of a source database on a target database, to allow for hot swapping of databases in an active/standby configuration, in case of system failure or other interruption in the operation of the source database. The source and target databases may be deployed in the same storage system, on different storage systems in the same data center, or on different storage systems remote from one another, for example in different data centers in different buildings, cities, states or countries. In another application, the CDC solution is used to replicate or recreate the state of a source database at a particular point in time for investigative or analytical purposes.

BRIEF SUMMARY

A system and method are described for change data capture wherein a source database is replicated to a remote database. In one embodiment, a data storage device contains source log blocks containing information respecting database transactions processed for a source database, wherein the data storage device and source database are located in a first location, and at least some of the source log blocks include a plurality of database transactions in the same order as processed in the source database. Messages containing source log blocks are sent from the first location to a second location geographically remote from the first location. One or more components at the second location receive source log blocks from the messages, extract the source transaction data from the source log blocks, and use the source transaction data to write database transaction information to a second database based on the extracted source transaction data.

BRIEF DESCRIPTION OF THE DRAWINGS

Aspects of the present disclosure are illustrated by way of example and are not limited by the accompanying drawings in which like references indicate like elements.

DETAILED DESCRIPTION

Illustrated and described herein below are methods, systems, apparatus, and computer products to provide a change data capture ("CDC") system that captures change data transactions in a data storage system and is capable of processing the captured changes into "replay-able" maintenance transactions that can be used as input to a wide variety of processes. For example, such processes may include audit routines, data replication and ETL (extract, transform, load) transformations.

Figure 1:
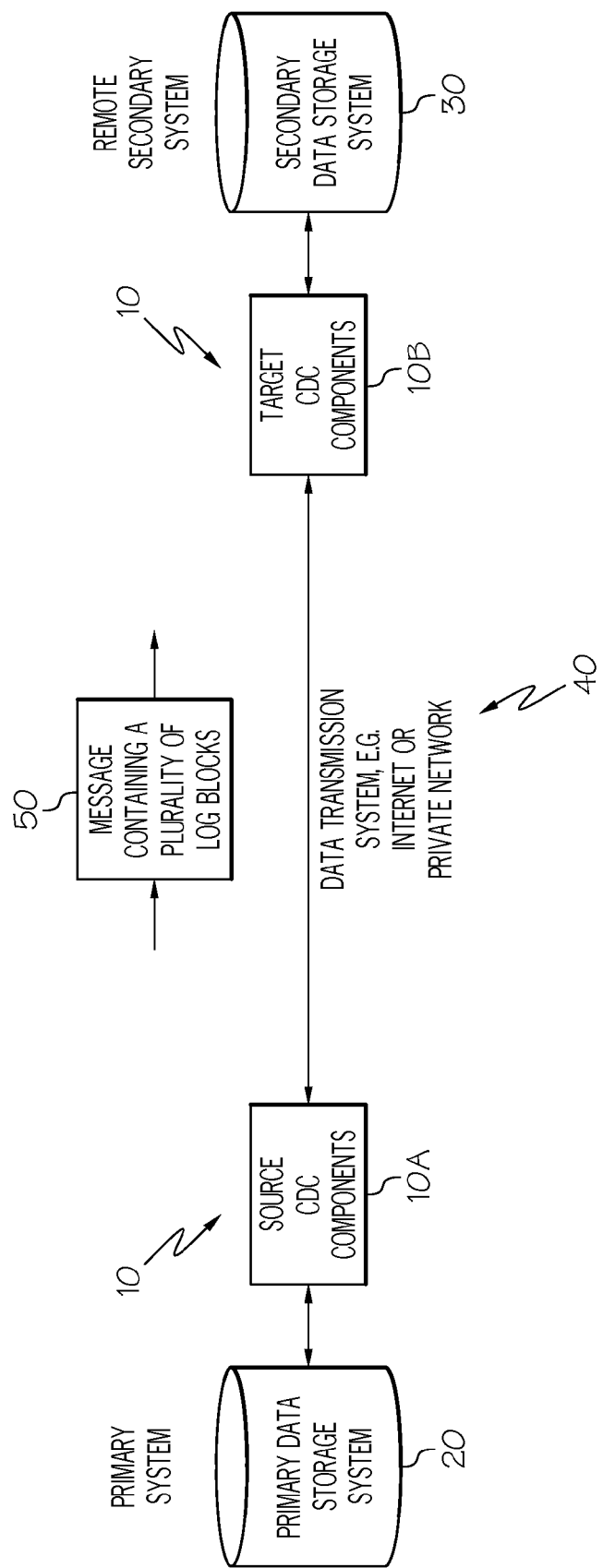
FIG. 1 illustrates a simplified block diagram of a change data capture system according to an example embodiment.

As illustrated in FIG. 1, according to one example embodiment, there is provided a CDC system where a primary (e.g., active) data storage system 20 is deployed at a first location, and a secondary (e.g., standby) data storage system 30 is located remotely from storage system 20. All database data exists on both systems, but maintenance transactions occur on only the primary system 20 and are replicated via a CDC system 10, having units 10A and 10B, to the secondary system 30. For example, in the case of a disaster, the secondary "standby" system 30 is available immediately for continued processing.

According to one example embodiment, there is provided a system and method for securely moving, over a data transmission system 40, the large number of individual maintenance records from the output of the CDC components 10A in the source data storage system 20 to the CDC components 10B in the remote environment for application to update the remote data storage system 30 with the transmitted database transactions. Data transmission system 40 may be, for example, the Internet, or a private data transmission system, or any combination thereof. Further, as explained in more detail below, the CDC system 10 described herein moves transaction log blocks 50 of data transactions captured by CDC processing in components 10A from the local side, i.e., the location of data storage system 20, to the "distant" side, i.e., to the location of data storage system 30, to achieve a number of advantageous performance benefits.

Figure 2:
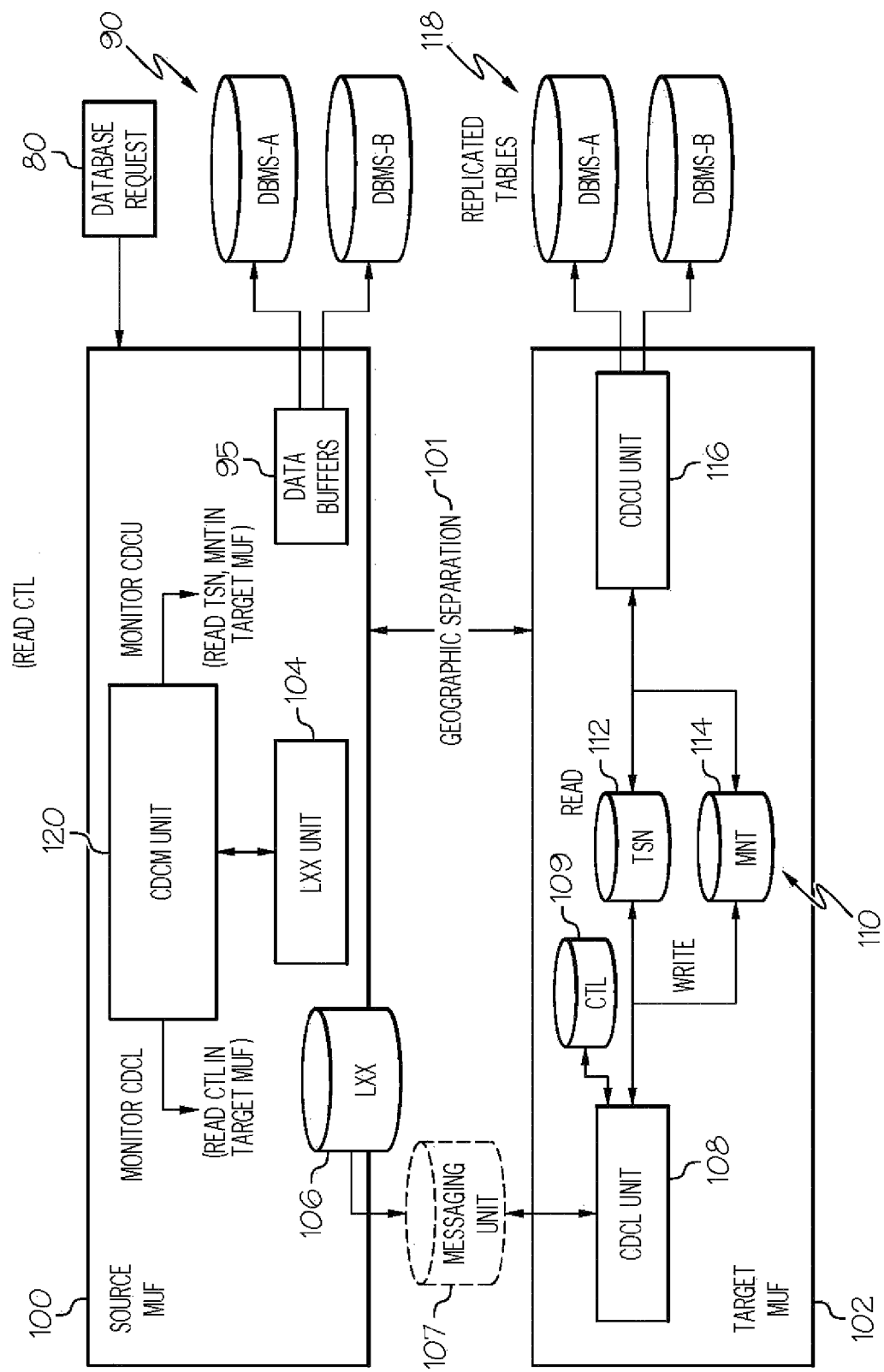
FIG. 2 illustrates a detailed block diagram of a change data capture system according to an example embodiment.
Figure 3:
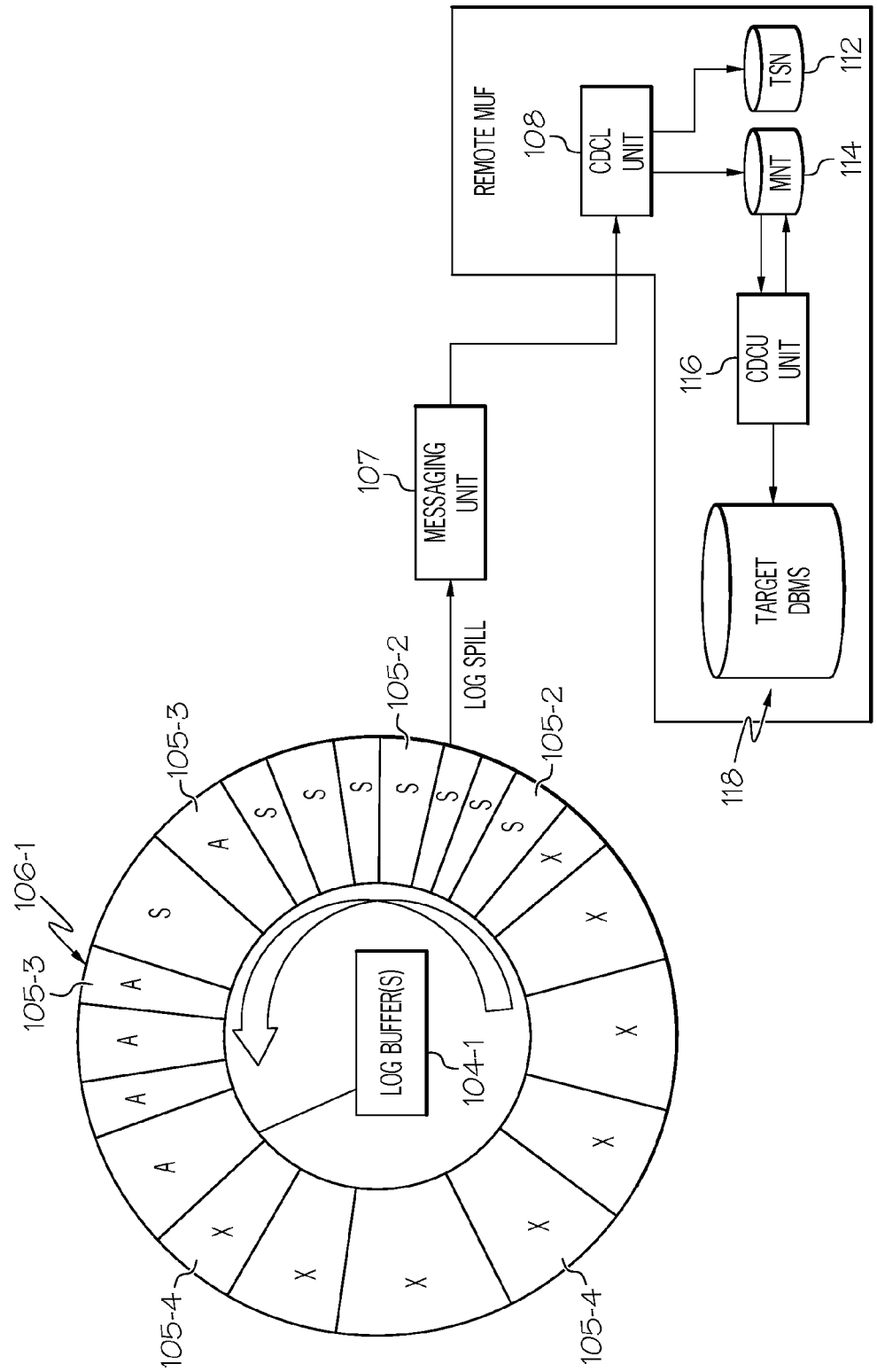
FIG. 3 illustrates the operation of a circular data buffer and log file operation according to an example embodiment.
Figure 4A:
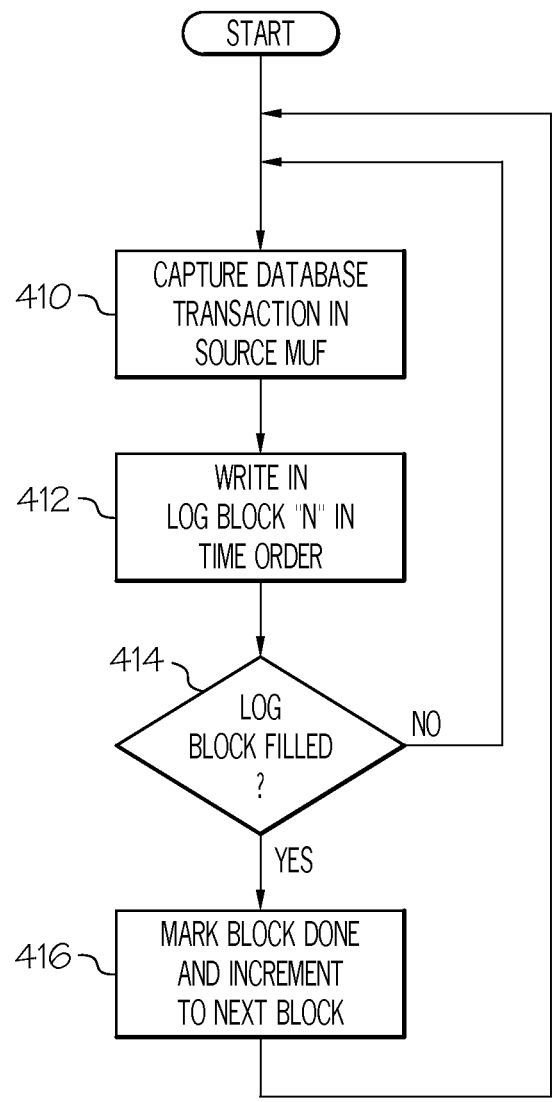
FIGS. 4A, 4B, 4C, 4D, and 4E are flow charts illustrating the operation of the systems and methods described herein.
Figure 4B:
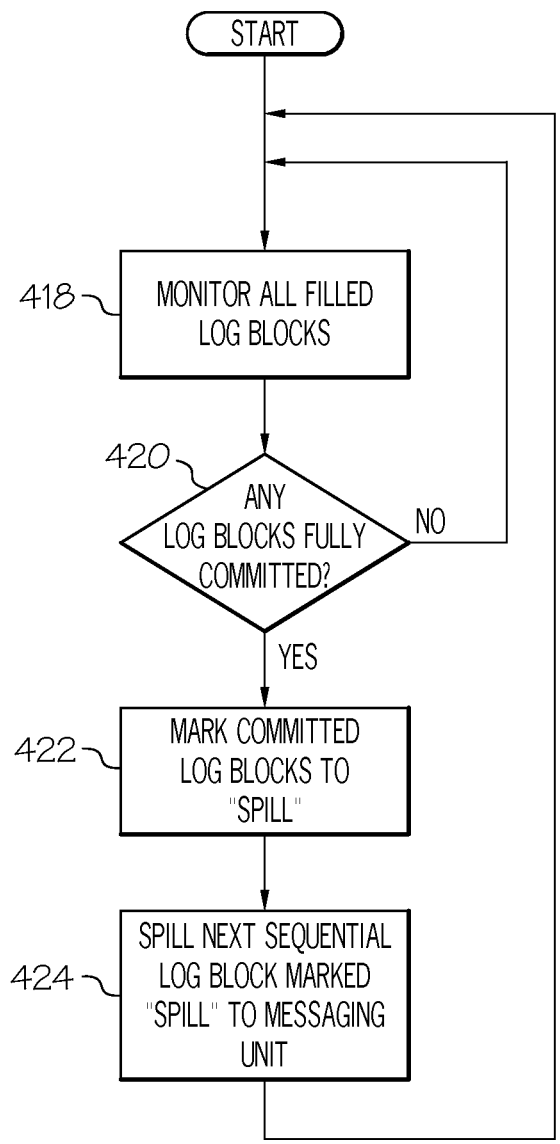
Figure 4C:
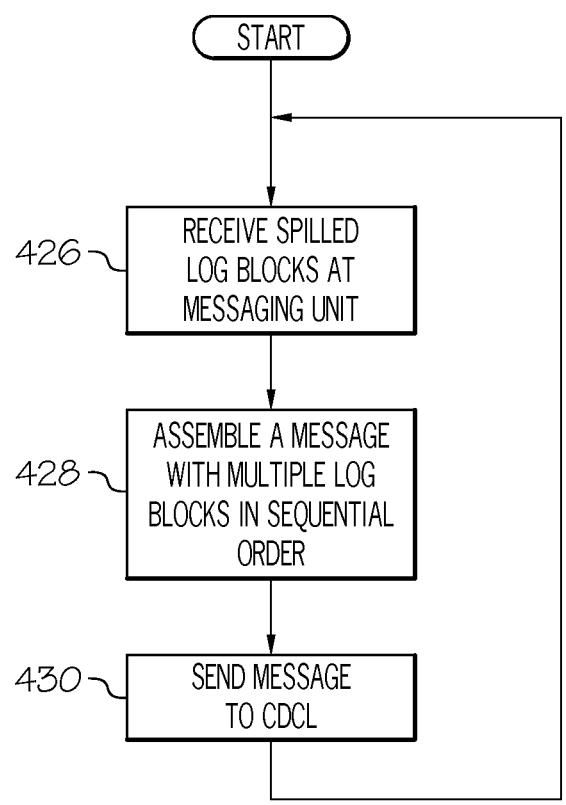
Figure 4D:
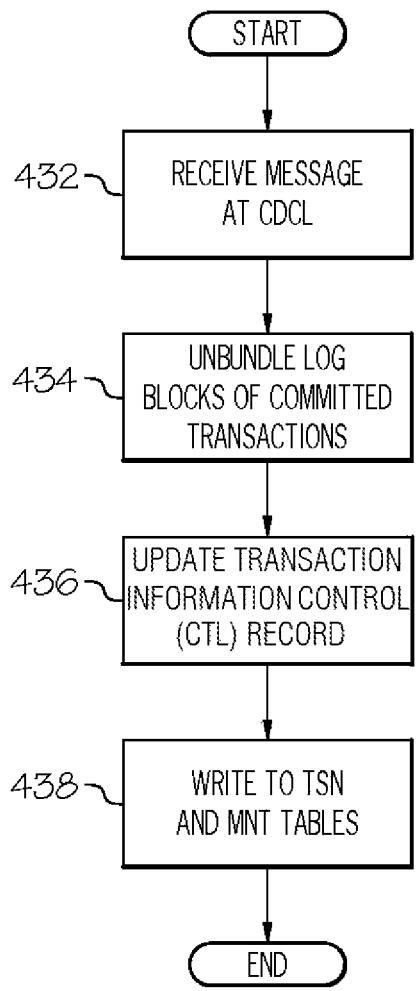
Figure 4E:
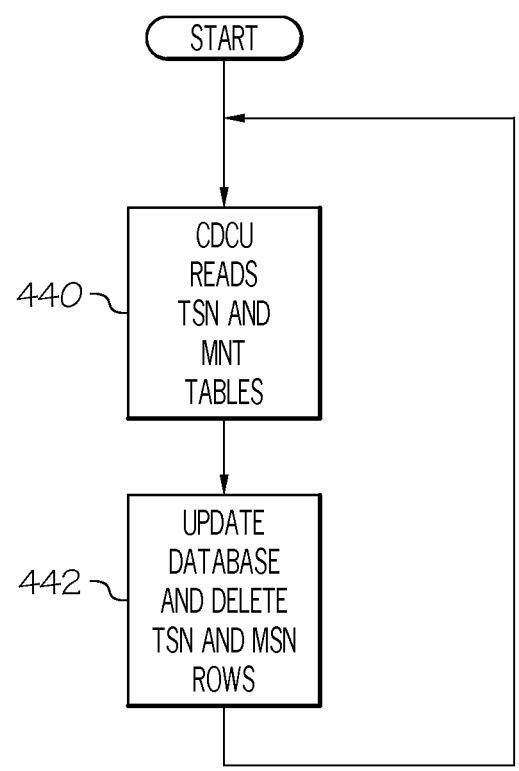

Referring now to FIG. 2, there is illustrated in more detail example systems and methods for CDC processing where the source data storage system, e.g., a Source Multi-User Facility (MUF) 100, is geographically separated 101 from the target data storage system, e.g. a Target MUF 102. According to one example embodiment, the Source MUF 100 is where "changed data" originates, and the Target MUF 102 is where the changed data is copied and re-applied. Source MUF 100 receives and processes database requests 80, and includes data buffers 95 to temporarily store data moving into and out of user databases 90 supported by Source MUF 100, that include, by way of example, a first DBMS-A and a second DBMS-B.

Log data LXX unit 104 operates to monitor data transactions, for example initiated by requests 80, in Source MUF 100, and capture LXX log file data in a LXX storage device 106, such as an electronic memory or magnetic storage medium. According to one example embodiment, log data LXX unit 104 includes one or more software components to control its processes, and data buffers to buffer data used in its processes.

According to one example embodiment, Log file data from LXX storage 106 is transmitted to a Change Data Capture Listener (CDCL) unit 108, through middleware messaging unit 107, which, for example, may use TCP/IP protocol or may be implemented, for example, using the IBM® Web Sphere MQ® message oriented middleware product sold by IBM Corporation. According to one example embodiment, messaging unit 107 transmits source log blocks from LXX storage 106 to CDCL unit 108, in the order that the log blocks are written into LXX storage 106 by the LXX unit 104, which in turn is in the same order as database transactions are committed to databases 90. Further, in this example embodiment, log blocks are spilled from storage LXX storage 106 to messaging unit 107 in time order, and grouped together, in time order, by messaging unit 107 into single messages combining multiple log blocks to reduce message volume. In addition, in this example, messages are sent in the same time order as the log blocks making up the messages. This provides that log blocks are received at CDCL unit 108 substantially in time order, an exception being in the event a lost or delayed message causes the order of arrival to be different than the order sent. Further, log blocks also contain "unique serial numbers" and a date-time stamp that allows the CDCL unit 108 to readily detect a lost message and to request it be resent.

CDCL unit 108, which in one example embodiment includes software to manage its processes and a data buffer, receives and unpacks messages from messaging unit 107, reassembles the LXX log file data, and extracts change transaction information to database 110, which includes a TSN table 112 and an MNT table 114. During the processing of the LXX log file data into the TSN table 112 and MNT table 114, the CDCL unit 108 maintains the "status" of the change transaction processing in the CTL storage device 109.

According to one example embodiment, the TSN table 112 includes one row per logical unit of work (LUW) and provides a transaction header (who, what, where). A row of table TSN is not written to the table until a LUW is committed. The MNT table 114 includes one row per data table change, including LUW information and in particular date and time of the LUW, table information (name database ID (DBID), etc.), and before or after row images. Each row of the MNT table 114 is written as the CDCL unit 108 processes transactions from the log data received from the middleware messaging unit 107.

A Change Data Capture User (CDCU) unit 116 processes (and/or deletes) committed database transactions to create replicated tables in databases 118. In one example embodiment, unit 116 includes both software, to manage its processes, and a data buffer used to move data from tables 112 and 114. A Change Data Capture Monitor (CDCM) unit 120 measures CDCL unit 108 and CDCU unit currency, by monitoring LXX unit 104 and/or storage 106, CTL storage device 109 and the transaction sequence number (TSN) table 112 and transaction monitoring table (MNT) 114. This monitoring assures that the CDC system does not get behind on processing log blocks so that critical information is overwritten, and if the system does get behind, implements procedures to allow the CDC system to catch up.

The various units described above may be implemented electronically in any number of different ways, for example using electronic programmed computers, with computer programs executing on a computer system to control the computer system to perform the respective electronic function or operation, or as dedicated electronic hardware to perform the respective electronic function or operation, or any combination thereof, as further explained below in the section entitled "Modules, Components and Logic."

Referring now to FIGS. 3, 4A, 4B, 4C, 4D and 4E, there is illustrated an example of the operation of the system of FIGS. 1 and 2. In this example, LXX unit 104 uses circular processing to capture (410) database transactions processed by the Source MUF 100, moving change data from the Source MUF 100 through a log buffer 104-1 to a circular LXX log file 106-1. In this example, database transactions are written (412, 414, 416) to the LXX log file 106-1 (also referred to as a dataset) in order of their occurrence, and may be variable in size. Unit 104 monitors (418) to determine which log blocks 105-3 contain transactions that are all fully committed (420), and then marks (422) the log block ready to spill (S) 105-2. The LXX log file 106-1 thus includes, in this example, a plurality of "S" log blocks 105-2 that contain committed database transactions that are ready to spill, a plurality of "A" log blocks 105-3 that contain database transactions still in the process of being committed, and therefore still active, and a plurality of "X" log blocks 105-4 that have been previously spilled and marked "empty" to receive new log blocks.

According to one example embodiment, log blocks 105-2 are always spilled (424) in time order, and never spilled before all transactions in the log block is committed. As illustrated in the illustrations, and as described above with respect to FIG. 1, log blocks from LXX storage 106 are passed under control of unit 104 from storage 106 to middleware messaging unit 107, which receives (426), assembles or bundles one or more log blocks into a message (428), and outputs the messages, for example by sending (430) the messages, in time order of the log blocks they contain, to CDCL unit 108.

CDCL unit 108 in turn receives (432) messages from unit 107. Unit 108 unbundles (434) the log blocks and assembles them into a buffer in time order. Database transactions are retrieved from the buffered log blocks and the CTL storage device is updated (436). CDCL unit 108 in turn uses the transactions to write (438) to the TSN and MNT tables 112 and 114, respectively.

The CDCU unit 116 in turn reads (440) data from the TSN table 112 and MNT table 114, and processes (442) the MNT/TSN against the target database 118, and thereafter deletes the MNT/TSN rows. In the event that log blocks in messages sent by messaging unit 107 are received out of order by CDCL unit 108, CDCL unit 108 reorders the log blocks into the proper order, using the time stamp information on the transactions stored in the block, or time information associated with the block itself. In the event a message is not received, CDCL unit 108 initiates a request to LXX unit 104 to reinitiate the resending of the missing message and corresponding log blocks. The resent message, upon receipt by CDCL unit 108, is then used to fill the missing log blocks required to update the CTL storage device 109.

According to one example embodiment, a single Target MUF 102 may be used to manage multiple CDCL's and CDCU's for multiple source MUF's. For example, in this example embodiment, the Target MUF 102 includes a CDCL, CTL storage device and a CDCU for each Source MUF 100, and maintains separate TSN and MNT tables for each source.

As described above, the distant CDC system moves all CDC-involved log blocks from the source to the target location, keeping the source and target locations synchronized. In various embodiments, a subset of log blocks is synchronized between the source and target locations. To synchronize a subset of log blocks, log blocks at the source may be marked to indicate whether there is an eligible table change in the log block, and only eligible blocks may be moved to the target location.

Thus, as described above, the distant CDC system moves CDC-involved log blocks from the source to the target location using a high speed process so that the core CDC operation can occur "close" to the target platform. This system and method provide a number of benefits, including avoiding a number of problems incident to extracting maintenance transactions at the Source MUF 100 and transmitting those transactions to the remote Target MUF 102, including but not limited to the overhead associated with transporting a large number of maintenance transactions from the Source MUF 100 to a Target MUF 102, maintaining the time order of maintenance transactions and requesting missing transactions if transactions are lost in transit, and the overhead required to perform the processes required to keep all maintenance transactions for a committed work group (LUW) together.

Example Platform Architecture

Figure 5:
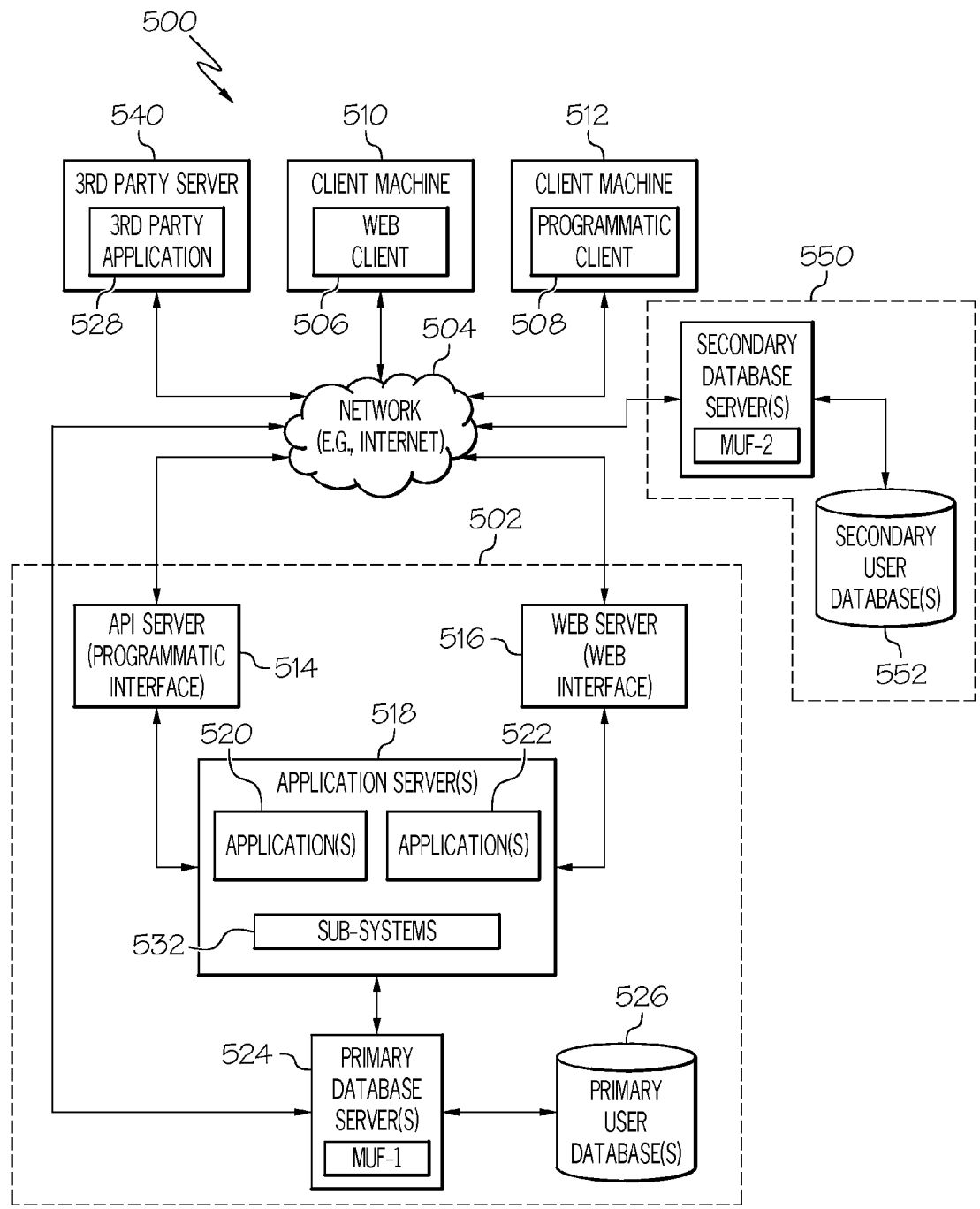
FIG. 5 is a block diagram illustrating an example embodiment of a change data capture system deployed in a networked environment according to an example embodiment.

FIG. 5 is a block diagram illustrating an example use of the systems and methods described above in a network-based, client-server system 500. A networked system 502, in the example forms a network-based system, provides server-side functionality, via a network 504 (e.g., the Internet or Wide Area Network (WAN)) to one or more clients 510, 512. FIG. 5 illustrates, for example, a web client 506 (e.g., a browser, such as Internet Explorer, Firefox or Chrome), and a programmatic client 508 executing on respective client machines 510 and 512. In an example, the client machines 510 and 512 can be in the form of a mobile device.

A server 514 and a web server 516 are coupled to, and provide programmatic and web interfaces respectively to, one or more application servers 518. Server 514 hosts, in one example embodiment, API's that may be programmatically accessed by client machines 510 and 512. The application servers 518 host one or more applications 520 and 522, and other sub-systems 532. The application servers 518 are, in turn, coupled to one or more primary database servers 524 that facilitate access to one or more primary user databases 526.

The applications 520 may provide a number of functions and services to users that access the networked system 502, as described otherwise herein. While the applications 520 and 522, and other sub-systems 532 are shown in FIG. 5 to all form part of the networked system 502, it will be appreciated that, in alternative embodiments, the applications 520 and 522 or others may form part of a service that is separate and distinct from the networked system 502.

Primary database servers 524 include, in this example, a Source MUF 100, and the source-side CDC components 10A (not shown in FIG. 5), and more particularly, an LXX unit 104, an LXX storage device 106, and source-side Messaging Unit 107 components. Source-side CDC components 10A are connected through a Messaging Unit 107 (that may be deployed on the database servers 524, or another server) and network 504, to a remote "target" data storage system 550, which includes replicated tables in a secondary user database 552, and remote-side CDC components 10B (not shown in FIG. 5), for example as described above, deployed in a Target MUF 102.

Further, while the system 500 shown in FIG. 5 employs a client-server architecture, the present system is of course not limited to such an architecture, and could equally well find application in a distributed, or peer-to-peer, architecture system, for example. The various applications 520, applications 522, and sub-systems 532 could also be implemented as standalone software programs, which do not necessarily have networking capabilities.

The web client 506 accesses the various applications 520 and 522, and optional sub-systems 532 via the web interface supported by the web server 516. Similarly, the programmatic client 508 accesses the various services and functions provided by the applications 520 and 522 via the programmatic interface provided by the API server 514.

FIG. 5 also illustrates a third party application 528, executing on a third party server machine 540, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more functions that are supported by the relevant applications of the networked system 502.

Modules, Components and Logic

Certain embodiments are described herein as including logic or a number of components, modules or units, or mechanisms, with the term "units" being used herein interchangeably with the term "modules", and having the same meaning Modules (also referred to as units) may constitute either software modules, (e.g., code embodied on a machine-readable medium or in a transmission signal) or hardware modules, or units. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
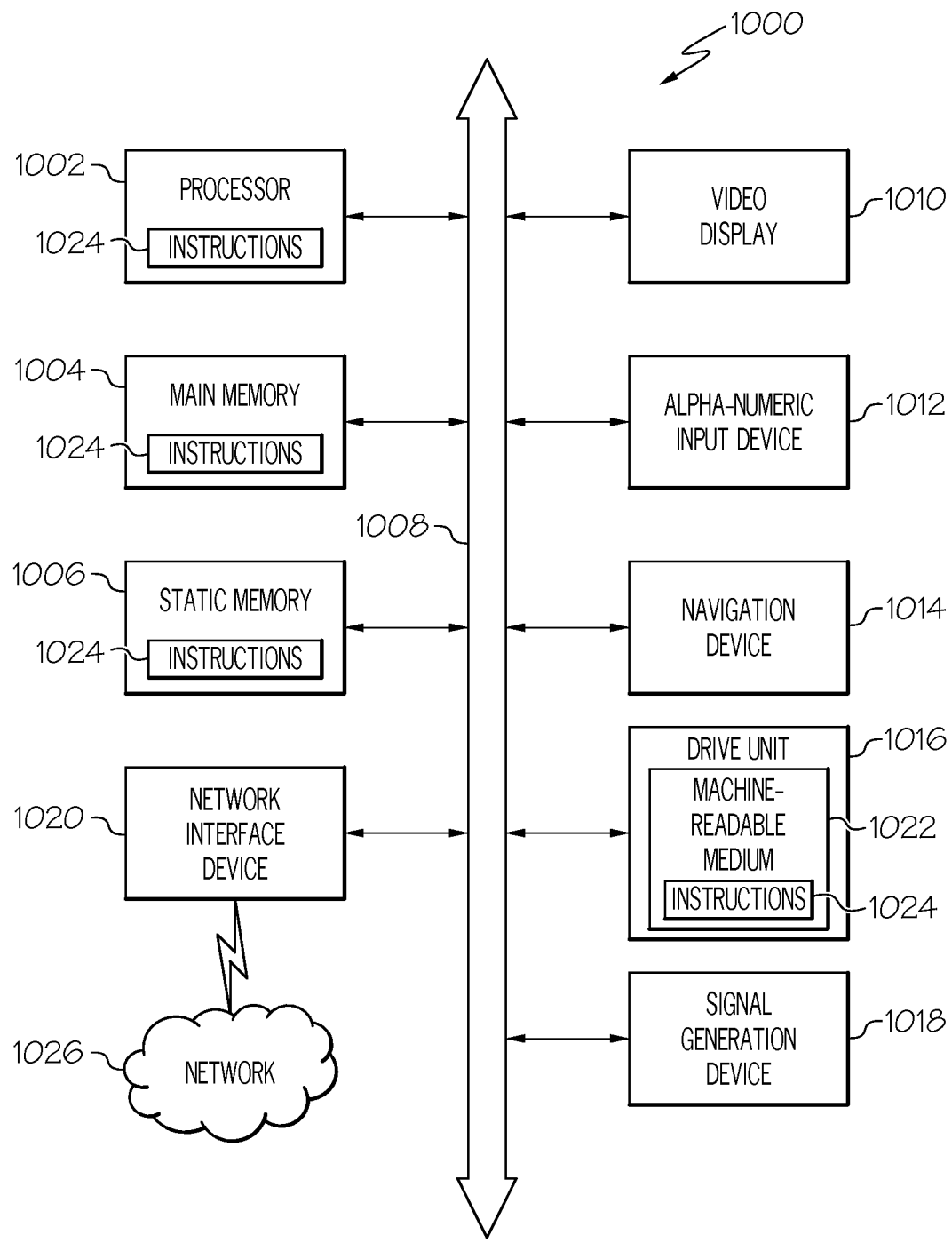
FIG. 6 is a diagrammatic representation of a machine in the example form of a computer system within which a set of instructions for causing the machine to perform any one or more of the methodologies discussed herein may be executed.

FIG. 6 is a block diagram of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present system, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for computer guided have been described. Although the present system has been described with reference to specific example embodiments, it will be evident that various modifications and changes may be made to these embodiments without departing from the broader scope of the system. Accordingly, the specification and drawings are to be regarded in an illustrative rather than a restrictive sense.

Although an embodiment has been described with reference to specific example embodiments, it will be evident that various modifications and changes may be made to these embodiments without departing from the broader scope of the system. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "system" merely for convenience and without intending to voluntarily limit the scope of this application to any single system or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the terms "a" or "an" are used, as is common in patent documents, to include one or more than one, independent of any other instances or usages of "at least one" or "one or more, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to impose numerical requirements on their objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for replicating source data storage changes to target data storage, said method comprising:
writing source database transactions to a circular log file in a sequential order in which the source database transactions are to be committed to a source storage, wherein the circular log file includes log entries that are each designated as active, empty, or ready to spill, and wherein said writing the source database transactions includes,
writing each of multiple sets comprising multiple source database transactions as a respective log block within a respective empty log entry until the respective log entry is filled;
monitoring the source database transactions in the filled log entries to determine whether all of the source database transactions in the corresponding log blocks have been committed to the source storage; and
for each of the filled log entries in which all of the source database transactions have been determined to have been committed to the source storage, changing the designation for the filled log entry to ready to spill;
for each of the ready to spill log entries, spilling the corresponding log block from the circular log file in an order corresponding to the order in which the source database transactions are committed to the source storage;
assembling multiple spilled log blocks into each of a plurality of messages; and
sending the messages, in a sequential order based on the order in which the log blocks were spilled, to a target database that is geographically remote from the source database.

2. The method of claim 1, further comprising receiving the messages and outputting a plurality of the log blocks extracted from the plurality of messages into a log block buffer in a sequential order corresponding to an order in which the messages are received.

3. The method of claim 2, further comprising retrieving the source database transactions assembled into the plurality of log blocks, and outputting the retrieved source database transactions to a change transaction log.

4. The method of claim 3, further comprising writing to a transaction sequence number (TSN) table and a transaction monitoring (MNT) table, in response to the retrieved source database transactions in the change transaction log.

5. The method of claim 4, further comprising processing the TSN table and MNT table against a target database to replicate the source database transactions.

6. The method of claim 2, further comprising reordering the log blocks into a correct order, if the log blocks are received out of order.

7. The method of claim 2, further comprising initiating a request to resend a missing one of the messages and corresponding log blocks.

8. A system for replicating source data storage changes to target data storage, said system comprising:
a first programmable processor executing a computer program embodied in a non-transitory machine-readable medium and is configured to,
write source database transactions to a circular log file in a sequential order in which the source database transactions are to be committed to a source storage, wherein the circular log file includes log entries that are each designated as active, empty, or ready to spill, and wherein said writing the source database transactions includes,
writing each of multiple sets comprising multiple source database transactions as a respective log block within a respective empty log entry until the respective log entry is filled;
monitoring the source database transactions in the filled log entries to determine whether all of the source database transactions in the corresponding log blocks have been committed to the source storage; and
for each of the filled log entries in which all of the source database transactions have been determined to have been committed to the source storage, changing the designation of the filled log entry to ready to spill;
for each of the ready to spill log entries, spill the corresponding log block from the circular log file in an order corresponding to the order in which the source database transactions are committed to the source storage; and
a second programmable processor executing a computer program embodied in a machine-readable medium configured to,
assemble multiple spilled log blocks into each of a plurality of messages; and
send the messages, in a sequential order based on the order in which the log blocks were spilled, to a target database that is geographically remote from the source database.

9. The system of claim 8, further comprising a third programmable processor executing a computer program embodied in a machine-readable medium configured to receive the messages and to output a plurality of the log blocks extracted from the plurality of messages into a log block buffer in a sequential order corresponding to an order in which the messages are received.

10. The system of claim 9, further wherein the third programmable processor outputs the source database transactions to a change transaction log.

11. The system of claim 10, further wherein the third programmable processor uses the change transaction log to replicate the source database transactions to the target database.

12. A program product comprising a computer program stored on a non-transitory machine-readable media for replicating source data storage changes to target data storage, the computer program comprising computer instructions executable on a computer system to:
  write source database transactions to a circular log file in a sequential in which the source database transactions are to be committed to a source storage, wherein the circular log file includes log entries that are each designated as active, empty, or ready to spill, and wherein said writing the source database transactions includes,
    writing each of multiple sets comprising multiple source database transactions as a respective log block within a respective empty log entry until the respective log entry is filled;
    monitoring the source database transactions in the filled log entries to determine whether all of the source database transactions in the corresponding log blocks have been committed to the source storage; and
    for each of the filled log entries in which all of the source database transactions have been determined to have been committed to the source storage, changing the designation for the filled log entry to ready to spill;
  for each of the ready to spill log entries, spill the corresponding log block from the circular log file in an order corresponding to the order in which the source database transactions are committed to the source storage; and
  assemble multiple spilled log blocks into each of a plurality of messages; and
  send the messages, in a sequential order based on the order in which the log blocks were spilled, to a target database that is geographically remote from the source database.

13. The program product of claim 12, further comprising computer instructions executable on the computer system to receive the messages and to output a plurality of the log blocks extracted from the plurality of messages into a log block buffer in a sequential order corresponding to an order in which the messages are received.

14. The program product of claim 13, further comprising computer instructions executable on the computer system to retrieve the source database transactions assembled into the plurality of retrieved log blocks, and to output the retrieved source database transactions to a change transaction log.

15. The program product of claim 14, further comprising computer instructions executable on the computer system to use the database transactions in the change transaction log to replicate the source database transactions in the target database.

\* \* \* \* \*